United States Patent Office 3,456,014
Patented July 15, 1969

3,456,014
PRODUCTION OF HEXAMETHYLENEDIAMINE
Logan C. Bostian, Richmond, Va., Grover L. Farrar, Littleton, Colo., and Harry E. Ulmer, Hopewell, Va., assignors to Allied Chemical Corporation, New York, N.Y., a corporation of New York
No Drawing. Filed Dec. 8, 1965, Ser. No. 512,535
Int. Cl. C07c 85/04, 87/14
U.S. Cl. 260—585    11 Claims

ABSTRACT OF THE DISCLOSURE

Process for the preparation of hexamethylenediamine by ammonolysis of 1,6-dibromohexane employing an excess of ammonia, temperatures in the range of about 100° C. to about 175° C. and a pressure of at least 1800 p.s.i.g. Under these conditions of temperature and pressure, 1,6-hexamethylenediamine is produced in excellent yield in the absence of a catalyst.

---

This invention relates to a new method for the production of hexamethylenediamine.

Hexamethylenediamine is a well known compound useful as a detergent, insecticide, emulsifying agent and as a valuable chemical intermediate, particularly in the synthesis of polyamides and polyester amides and its preparation has been the subject of numerous investigations. The literature contains many references to methods for the preparation of alkylene diamines. Among these, the sodium reduction of dinitriles, the hypochlorite degradation of diamines and the reaction of dihalides with ammonia may be mentioned. The several commercial routes to hexamethylenediamine now available employ furfural, butadiene or acetylene as raw materials. These raw materials are relatively expensive and the routes employing them require many laborious and time consuming steps which tend to increase cost and decrease overall yields. It is known to react hydrocarbon dihalides with ammonia to prepare polymethylene diamines. Japanese Patent 158,357 (C.A. 44, 1132d, 1950) discloses this method and employs a catalyst prepared by heating aluminum dust first with sodium carbonate and then with sodium hydroxide. The preparation of the catalyst appears to be very critical and time-consuming and presents the additional difficulties acompanied by catalyst separation. There is thus a continued need for a simple and more economical route to this important chemical compound that is free from the disadvantages discussed above.

It is therefore an object of this invention to provide a method for the production of hexamethylenediamine in high yields providing an economical utilization of low cost raw materials and by-products.

Other objects will be apparent from the description of the invention given hereafter.

The above objects are accomplished according to our improved process whereby hexamethylenediamine, hereafter referred to as HMDA, is produced by the ammonolysis of 1,6-dibromohexane in the absence of a catalyst employing biallyl, (1,5-hexadiene) and HBr as the starting raw materials. The major chemical reactions involved may be readily understood from the following equations:

(1) $(CH_2CH=CH_2)_2 + 2HBr \rightarrow Br(CH_2)_6Br$ (2) $Br(CH_2)_6Br + 2NH_3 \rightarrow NH_2(CH_2)_6NH_2 + 2HBr$ (3) $NH_2(CH_2)_6NH_2 + 2HBr \rightarrow NH_2(CH_2)_6NH_2 \cdot 2HBr$ The present invention, as illustrated above, therefore relates to the unexpected discovery that 1,6-dibromohexane readily undergoes ammonolysis, in the absence of a catalyst, but under specific conditions of pressure, defined below, to yield HMDA·2HBr in excellent yields from which HMDA and HBr may be readily recovered.

The process may be briefly stated as follows:

Biallyl and hydrogen bromide are reacted, preferably at a temperature of about 5° C., with or without a solvent, in the presence of a free radical catalyst such as organic peroxides, preferably, benzoyl peroxide. This reaction provides high yields of the desired 1,6-dibromohexane together with a small amount of 1,5-dibromohexane. The bromohexanes are reacted with a large excess of anhydrous ammonia, preferably from 60 to 100 moles of ammonia and particularly 70–90 moles of ammonia per mole of dibromohexane at 1800–5000 p.s.i.g., preferably 3000 to 4000 p.s.i.g., and at 100–175° C., preferably 130–150° C. Under these reaction conditions yields of 80 to about 95 percent HMDA as the dihydrobromide are produced. Pressure is reduced over the reaction mixture to remove ammonia which may be recycled for subsequent use. HMDA and HBr may be recovered from the dihydrobromide by any of known methods. An important feature of the present process is the fact that high yields of the bromine values may be recovered and reused in subsequent reactions. We have found that HMDA and HBr are recovered in excellent yields by effecting the recovery in a simple process involving the addition of sulfuric acid to regenerate HBr. In one embodiment, HMDA·2HBr is first neutralized with sodium hydroxide and HMDA recovered from the sodium bromide thus formed by extraction with ether or azeotropic drying. HBr is regenerated from sodium bromide by treatment with concentrated sulfuric acid. In a second embodiment, HMDA and HBr are recovered directly from HMDA·2HBr by treatment with concentrated sulfuric acid whereby HBr is evolved,

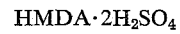
$$HMDA \cdot 2H_2SO_4$$

thus formed is readily neutralized with lime and HMDA recovered from water by azeotropic drying employing a $C_6$–$C_{12}$ hydrocarbon or hydrocarbon mixture from which HMDA is recovered by either stripping away and recycling the hydrocarbon, or, with certain solvents, by precipitating the HMDA by cooling the solution, filtering off the solid HMDA and recycling the hydrocarbon. Aromatic hydrocarbons such as toluene may be employed for this purpose as well as linear aliphatic hydrocarbons such as heptane or mixtures thereof boiling between 80° C. and 130° C. such as petroleum naphtha.

The various specified variables of pressure, temperature and proportions are of critical importance in this invention. A high ammonia to dibromohexane ratio is necessary for good yields since low ratios lead to extensive polyamine formation. When ratios of ammonia to dibromohexane below 60/1 are employed, polymer formation becomes a serious problem. As will be shown below, very low yields are obtained when the reaction pressure is below about 1800 p.s.i.g., best results being attained at about 3500 p.s.i.g. In a preferred embodiment, an inert gas such as nitrogen is employed to increase the pressure in the reaction vessel. The higher range of temperature permits reaction times as low as five minutes while the lower range requires up to five hours for good results.

When sulfuric acid is employed to regenerate HBr in the recovery step, best results are obtained if the acid is of a concentration of from 92 to 100 percent, preferably 96 percent.

The following examples, in which all parts are by weight, illustrate specific embodiments of the invention.

Example 1

Toluene (450 parts) and 1,5-hexadiene (41 parts) are charged to a reactor and the solution is cooled to 5° C.

A solution of benzoyl peroxide (2.4 parts) in toluene (50 parts) is added continuously while 85 parts anhydrous hydrogen bromide are introduced during a period of 0.8 hour. After this time, reaction is allowed to continue at 5° C. for 0.5–1.0 hour. The reaction mixture is washed once with 250 parts water, twice with 250 parts 2% sodium hydroxide solution and finally with 250 parts water. The toluene is removed by distillation, and 112 parts of 1,6-dibromohexane of 95% purity boiling at 114–115° C./8 mm. is obtained. Yield is 87.4% of theory based on biallyl used.

The 95% pure 1,6-dibromohexane (112 parts) and liquid ammonia (624 parts) are charged to an autoclave and pressured to 2000 p.s.i.g. with nitrogen. The autoclave is heated to 140° C. in about ½ hour and held at 140° C. for 5 minutes; 4000 p.s.i.g. pressure is developed. The autoclave is quickly cooled to ambient temperature, excess ammonia is vented, and residual contents are mixed with 150 parts of 50 wt. percent aqueous sodium hydroxide solution to convert the bromide to sodium bromide. The resulting solution is extracted twice with 500 parts ethyl ether to remove HMDA, the extracts mixed and evaporated to give 43 parts HMDA corresponding to a 74% yield based on biallyl starting material used.

Example 2

Toluene (41 parts) and 1,5-hexadiene (41 parts) are charged to a reactor and the solution cooled to 10–20° C. Anhydrous HBr (85 parts) is added over a 2–3 hour period of time in the presence of UV radiation. The reaction mixture is washed with water (250 parts), twice with 2% sodium hydroxide solution (250 parts) and finally with water (250 parts). Toluene is removed by distillation and crude 1,6-dibromohexane (112 parts) obtained containing 1,6-dibromohexane (107 parts) for an 88% yield, based on 1,5-hexadiene used. The crude 1,6-dibromohexane (112 parts) and liquid ammonia (624 parts) are charged to an autoclave and pressured to 2000 p.s.i.g. with nitrogen. The autoclave is heated to 140° C. in about ½ hour and held for 5 minutes at this temperature; 4000 p.s.i.g., pressure is developed. This autoclave is quickly cooled to ambient temperature and excess ammonia vented. To the residue (approximately 129 parts) is slowly added 96% $H_2SO_4$ (103.7 parts) with stirring at room temperature and about 0.5 atmosphere pressure. After a slight endothermic reaction, the mixture is gradually heated to about 100° C. over a 1-hour period and the HBr (69.8 parts) evolved for 93% recovery. The resulting residue (about 162 parts) containing $$HMDA \cdot 2H_2SO_4$$

(144 parts) is dissolved in water (155 parts) and reacted with calcium hydroxide (75 parts) slurried in water (238 parts). After thorough stirring of the mixture, $CaSO_4 \cdot xH_2O$ is removed by filtration. The water from the filtrate is removed by azeotropic drying with heptane (435 parts) and HMDA (43.5 parts) reclaimed in 75% overall yield based on original 1,5-hexadiene.

The following examples illustrate the improved and unexpected results obtained when the reaction vessel pressure is increased to above 1800 p.s.i.g. when compared to results obtained when the pressure is below 1800 p.s.i.g.

Example 3

1,6-dibromohexane (12.2 parts), prepared from biallyl as described in Examples 1 and 2, and liquid ammonia (68 parts) are charged to an autoclave and pressured to 2000 p.s.i.g. with nitrogen. The autoclave is heated to 150° C. and held at this temperature for one hour; 3200 p.s.i.g. pressure is developed. The autoclave is quickly cooled to ambient temperature, excess ammonia is vented and residual contents are mixed with water (20 parts). NaOH (8 parts) is added to salt out HMDA, which is removed by extraction with ethyl ether (150 parts). Upon removal of solvent, HMDA (5.3 parts) is recovered in 91.4% yield.

Example 4

The process of Example 3 is repeated without prepressuring with nitrogen, 1600 p.s.i.g. pressure is developed at 150° C. after one-hour's time. From the 1,6-dibromohexane (12.2 parts) and liquid ammonia (68 parts), HMDA (2.6 parts) was obtained in 45.7% yield.

The following example illustrates an alternate procedure for recovery of HMDA when prepared by the procedure employed in Example 1.

Example 5

A. Toluene (219 parts) was added to a mixture of NaBr (447 parts), HMDA (207 parts), water (260 parts), and NaOH (7.4 parts). The mixture was heated and the azeotrope distilled using a 2–3-plate vacuum jacketed Vigreux column giving an anhydrous slurry. The water layer of the azeotrope contained one part (<0.5% of total HMDA) HMDA. The anhydrous slurry was filtered through a steam heated filter funnel and the filter cake washed with toluene (100 parts) at 50° C. The filtrate consisted of HMDA (200 parts–96.6% of the original HMDA) and toluene (319 parts). Since the solubility of HMDA in toluene is about 20% at 20° C., additional HMDA may be recovered by removing most of the toluene by distillation and recycling and fractionating the residual HMDA.

B. Heptane (100 parts) was added to a mixture of NaBr (217 parts), HMDA (100 parts), water (126 parts), and NaOH (3.6 parts). Azeotropic removal of water resulted in an 0.35 part (0.35% total HMDA) HMDA loss. Filtration of the resulting anhydrous slurry gave 216 parts (99.6% recovery) of NaBr. HMDA (94 parts, 94%) was recovered in the filtrate by precipitation at 20° C.

The following example illustrates a typical procedure for regeneration of HBr from sodium bromide recovered in Examples 1 and 3.

Example 6

6.04 sodium bromide (189 parts) is charged to a reactor containing 100 parts 48% hydrobromic acid. The resulting mixture is heated to 120–130° C. under half atmospheric pressure and 197 parts 96% sulfuric acid is added dropwise, generating 143 parts anhydrous hydrogen bromide (96% recovery), which is returned for reaction with 1,5-hexadiene.

HBr may be recovered directly from $HMDA \cdot 2HBr$ as mentioned above by mixing concentrated $H_2SO_4$ and $HMDA \cdot 2HBr$ at about 25° C. and then *gradually* raising the temperature of the mixture to about 100° C. and collecting the HBr evolved. The $HMDA \cdot 2H_2SO_4$ formed by this procedure is neutralized with lime giving a mixture consisting primarily of $CaSO_4$, $H_2O$ and HMDA. The $CaSO_4$ is separated by filtration, and the HMDA recovered from its aqueous solution by the azeotropic drying technique outlined above. This procedure permits the use of a cheap base, eliminates NaBr handling and simplifies HMDA recovery. This procedure, employed in Example 2 is further illustrated in the following example.

Example 7

A. $HMDA \cdot 2HBr$ (111.2 parts) was charged to a reactor and 96% $H_2SO_4$ (89.6 parts) was added slowly with stirring at room tempertaure under about 0.5 atmosphere pressure. The reaction was slightly endothermic. Upon completion of the acid addition, the mixture was gradually heated to about 100° C. over a one hour period. Hydrogen bromide (60.2 parts) was evolved for a 93% recovery.

B. $HMDA \cdot 2H_2SO_4$ (90.5 parts) in water (100 parts) was mixed with a slurry of calcium hydroxide (47.4 parts) in water (150 parts). After thorough stirring of the reaction mixture, calcium sulfate was removed by filtration. The water from the filtrate was removed by azeotropic drying with heptane (274 parts). HMDA (33.2 parts) was reclaimed from the heptane for a 99% recovery.

We claim:

1. A method for the production of hexamethylenediamine which comprises ammoniating 1,6-dibromohexane in the absence of a catalyst with liquid ammonia in a mole ratio of at least 60 moles of ammonia per mole of 1,6-dibromohexane at a temperature of from about 100° to 175° C. and at a pressure of at least about 1800 p.s.i.g. to produce hexamethylenediamine dihydrobromide and recovering hexamethylenediamine and HBr therefrom.

2. The method of claim 1 wherein hexamethylenediamine and HBr are recovered by:
   (a) admixing $H_2SO_4$ with the reaction product to effect evolution of HBr
   (b) neutralizing the remaining reaction mass with an alkaline base and
   (c) recovering hexamethylenediamine therefrom.

3. The method of claim 1 wherein hexamethylene-diamine and HBr are recovered by:
   (a) neutralizing the reaction product with an alkaline base
   (b) admixing a hydrocarbon with said neutralized mixture
   (c) distilling the resulting azeotrope to effect separation of a hydrocarbon containing hexamethylenediamine from the reaction mass
   (d) recovering hexamethylenediamine from said hydrocarbon and
   (e) effecting the evolution of HBr by adding $H_2SO_4$ to the remaining neutralized mass.

4. The method of claim 3 wherein said alkaline base is sodium hydroxide and said hydrocarbon is toluene.

5. The method of claim 2 wherein said alkaline base is calcium hydroxide.

6. The method of claim 2 wherein the evolution of HBr is effected by heating to about 100° C.

7. The method of claim 2 wherein hexamethylene-diamine is recovered from the remaining reaction mass by azeotropic drying with a hydrocarbon.

8. The method of claim 1 wherein said ammonia is present in an amount of about 60 to 100 moles of ammonia per mole of 1,6-dibromohexane.

9. The method of claim 1 wherein said ammonia is present in an amount of about 70 to 90 moles of ammonia per mole of 1,6-dibromohexane.

10. The method of claim 1 conducted at a pressure of about 1800 to about 5000 p.s.i.g.

11. The method of claim 1 conducted at a pressure of about 3000 to 4000 p.s.i.g.

References Cited

UNITED STATES PATENTS

| | | | |
|---|---|---|---|
| 2,058,466 | 10/1936 | Kharasch | 260—663 |
| 2,268,620 | 1/1942 | Rigby | 260—585 |

OTHER REFERENCES

Gunshi, Chem. Abs., 1950, vol. 44, p. 1132d.

CHARLES B. PARKER, Primary Examiner

PATRICIA C. IVES, Assistant Examiner

U.S. Cl. X.R.

23—154; 260—663